United States Patent [19]

Barber et al.

[11] 4,224,863
[45] Sep. 30, 1980

[54] DONUT MAKING DEVICES

[75] Inventors: Eugene F. Barber; Steven C. Barber, both of Minneapolis, Minn.

[73] Assignee: Wee Donuts, Inc., Princeton, N.J.

[21] Appl. No.: 23,077

[22] Filed: Mar. 23, 1979

[51] Int. Cl.³ ............................................. A47J 37/12
[52] U.S. Cl. ................................... 99/331; 99/341; 99/343; 99/354; 99/406; 99/407; 99/409; 99/442; 425/288
[58] Field of Search .............. 99/442, 341, 352, 353, 99/354, 404, 405, 406, 409, 331, 342, 343, 407; 425/190, 288

[56] References Cited

U.S. PATENT DOCUMENTS

| | | | |
|---|---|---|---|
| 1,492,542 | 4/1924 | Bergner | 99/354 X |
| 1,665,017 | 4/1928 | Bergner | 99/406 |
| 1,688,315 | 10/1928 | Denz | 99/406 |
| 1,817,887 | 4/1931 | Hunter | 99/354 |
| 2,083,082 | 6/1937 | Moran | 99/406 |
| 2,590,157 | 3/1952 | Corbett | 99/409 X |
| 2,716,377 | 8/1955 | Lindsey | 99/406 |
| 2,767,641 | 10/1956 | Ackles | 99/409 X |
| 2,840,012 | 6/1958 | Giles | 425/288 |
| 4,082,033 | 4/1978 | Fester | 99/409 X |

*Primary Examiner*—Billy J. Wilhite
*Attorney, Agent, or Firm*—Howard I. Schuldenfrei

[57] ABSTRACT

A portable device for making donuts and the like which includes a batter extruder, a cooking scroll into which the extruded batter is received, a heating element underlying the scroll for heating the cooking medium introduced therein for cooking the extruded batter, a circulation pump for circulating the cooking medium in which the extruded batter is carried through the scroll, a temperature regulator for regulating the temperature of the cooking medium in the scroll, a flow controller for controlling the flow of cooking medium through the scroll, and a conveyor for evacuating the finished product from the scroll. The extruder and flow controller are synchronized, whereby a continuous stream of raw batter may be introduced into the cooking medium and cooked therein.

13 Claims, 18 Drawing Figures

DONUT MAKING DEVICES

BACKGROUND OF THE INVENTION

This invention relates generally to a novel device for manufacturing a confection and more particularly to a novel portable donut maker. The instant invention further relates to a modular donut maker which continuously extrudes, fries and delivers the product, as desired, at its point of purchase.

Consumers of prepared foods such as cake, bread and the like have become increasingly conscious of the freshness of the products they purchase. Product freshness is recognized as a pivotal factor in the successful merchandising of cake and bread and the like. These products are known as limited shelf life products, which are subject in many instances to state datestamping regulations. Manufacture of these products usually occurs at a point distant from the retail sites thereof. Therefore, their useful lives are further foreshortened by packaging and transport time.

Consumer confidence in "bakery fresh" goods sold over retail counters is also lacking. In situ manufacture of a product at its point of purchase allays consumer suspicion concerning its freshness and increases consumer confidence in the product, per se, as well as the conditions under which it is manufactured. Accordingly, the present invention satisfies these consumer concerns.

SUMMARY OF THE INVENTION

Generally speaking, in accordance with the invention, a portable device for making a confection such as a donut is provided which includes a batter extruder, a cooking scroll into which the extruder batter is received, means underlying the scroll for heating a cooking medium introduced into the scroll to cook the extruded batter, means for circulating the cooking medium in which the extruded batter is carried through the scroll, means for regulating the temperature of the cooking medium in the scroll, means for controlling the flow of cooking medium through the scroll, means for uniformly cooking the extruded batter in the cooking medium and means for evacuating the finished product from the scroll. The extruder and cooking medium flow control means are synchronized, whereby a continuous stream of raw batter may be introduced into the cooking medium and cooked therein.

The device is modular and may be broken-down with ease for periodic cleaning; a significant mechanical advantage of the device, contributing to its long useful life and low maintenance profile. All steps of the process of manufacture of the product are visible to an on-looker, which is a significant commercial advantage of the device.

Accordingly, it is an object of this invention to provide a portable device for the in situ production of a confection, such as a donut, at its point of purchase.

Another object of the invention is to provide a device which is capable of mass producing a uniform product at the point of purchase of the product.

A further object of the invention is to provide a device for manufacturing a cooked confection, which may be operated by an unskilled layman, without any diminution of product quality.

Still another object of the invention is to provide a donut-making device which is easily maintained and cleaned.

Still other objects and advantages of the invention will in part be obvious and will in part be apparent from the specification. The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE INVENTION

Figure 1:
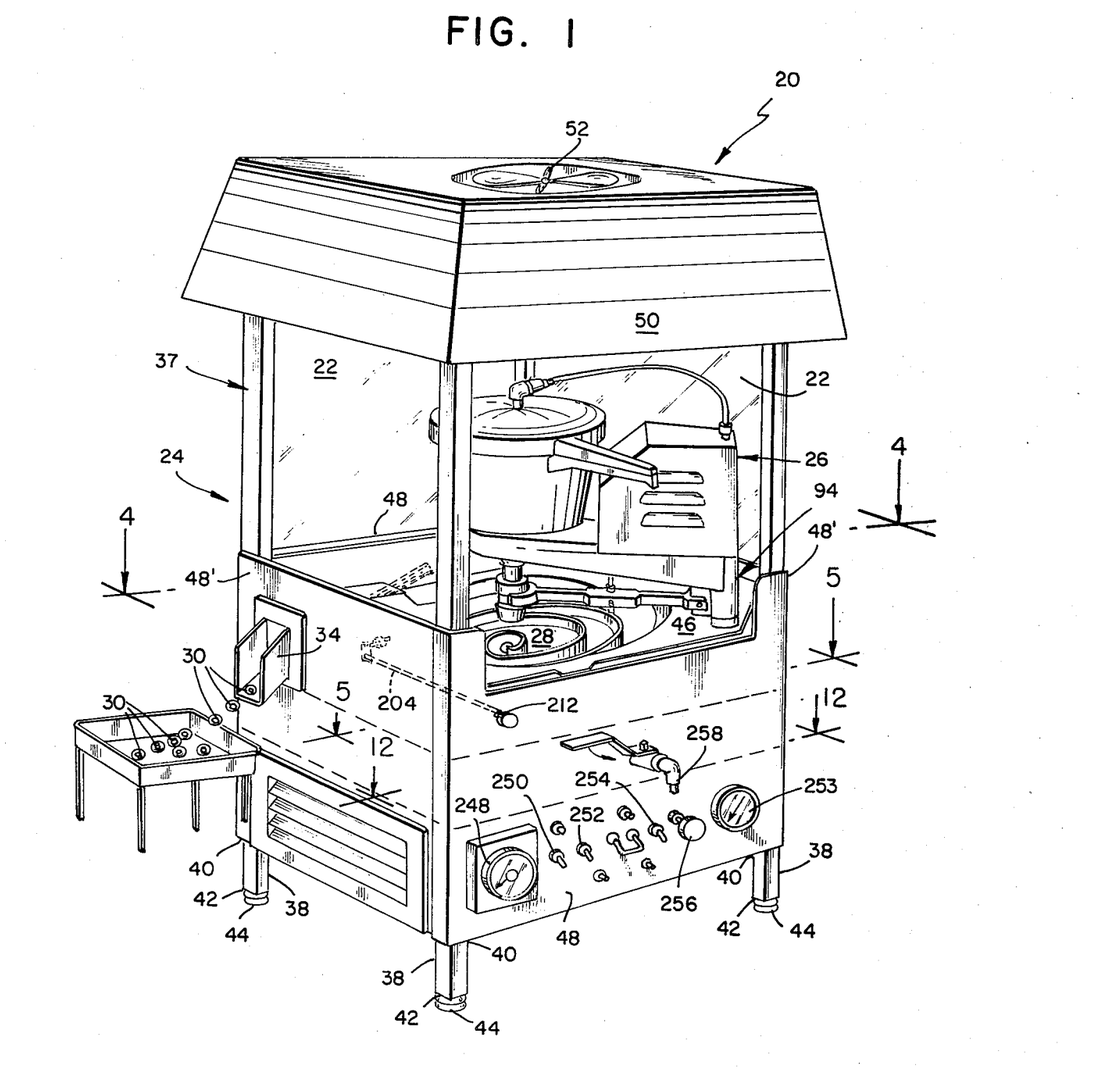
FIG. 1 is a perspective view of one type of donut maker constructed in accordance with the invention.

Referring now to the Drawings, a donut maker 20 within the scope of the invention is depicted in FIG. 1. The unit is portable, has a modular construction and may be mounted on any substantially planar surface. On-stream production of the product, namely donuts, may be observed through transparent panels 22 which are slideably mounted in housing 24, which fully encloses the device. Journalled in housing 24 is an extruder 26 which synchronously feeds raw viscous batter (not shown) into a spiral scroll 28 in which the batter is cooked in a controlled stream of hot liquid shortening. The cooking cycle of the batter is commensurate with the time spent in-stream in the spiral scroll 28. The cooked product 30 is deposited on an endless conveyor 32, best seen in FIG. 4, which transports it to a chute 34, through which it exits the device 20. The finished product is ready for consumption.

Housing 24 comprises a substantially rectangular liquisealed enclosure 36 which houses fluid sensitive elements of the device and a transparent cooking chamber 37 in which the product is prepared, from a premixed batter, and cooked. Enclosure 37 upstands on a plurality of legs 38 each having an end 40 respectively connected to the bottom panel thereof and a respective free end 42 in which a load leveler 44 is threadably journalled. Load levelers 44 may be discretely adjusted to compensate for variations in the character of the surface on which the device 20 is mounted. For optimal performance, the device 20 is mounted on a true vertical axis and load levelers 44 are adjusted to optimally position the device 20.

Figures 5, 10, 11:
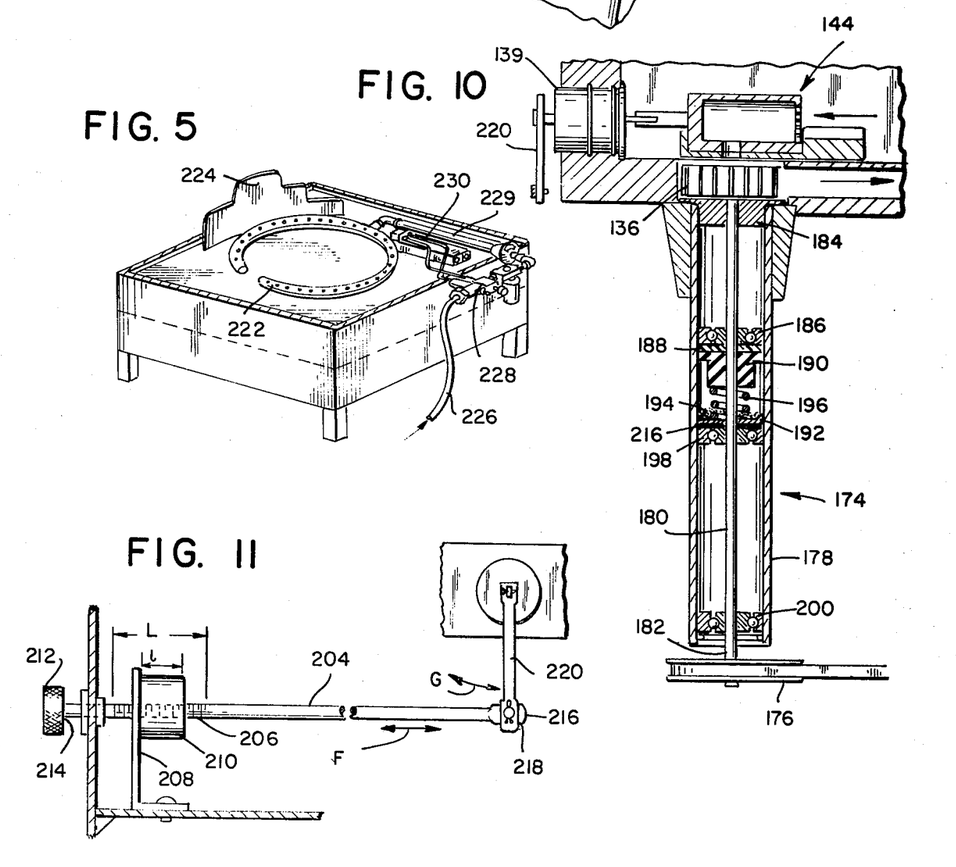
FIG. 5 is a sectional view taken along line 5—5 of FIG. 1.
FIG. 10 is a sectional view of a means for controlling and circulating the flow of a cooking medium through the scroll.
FIG. 11 is an elevated plan view of a means for controlling the flow of the cooking medium in the scroll.

Spiral scroll 28 is externally formed in the top panel 46 of rectangular enclosure 36. Cooking chamber 37 is formed by vertically mounted transparent panels 22, preferably fabricated of plexiglass, which are slideably mounted in the respective top ends of paired side walls 48, 48 and 48', 48' of enclosure 36 for instance in a continuous sleeve formed in the top rim of the side walls of enclosure 36. Overfitting panels 22 is a demountable hood 50 in which an exhaust fan 52 is operatively mounted for the purpose of evacuating odors, smoke, and reducing the heat build-up in cooking chamber 37. Side panels 48' and 48' of enclosure 36 are louvered, whereby controlled ambient air may circulate through enclosure 36 to reduce heat build-up therein and/or fuel the gas fire selectively maintained therein, as best seen in FIGS. 1 and 5.

Selective extrusion of the raw viscous batter into the stream of hot liquid shortening in scroll 28 is controlled by extruder 26, which generally comprises a pressurizeable container 54 into which the raw viscous batter is, for instance, manually introduced; a nozzle 56 mounted in container 54 through which the batter in container 54 is discharged; and a nozzle sleeve 58 oscillatably mounted on nozzle 56 which forms the discharged batter and feeds the conformed discharge into the stream of shortening in scroll 28. Container 54 includes a vessel 60 which holds the viscous batter and a cover 62 overfitting the mouth thereof. The level of viscous batter in vessel 60 is uniformly reduced by a pusher plate 64, movably mountable in vessel 60 to overlie batter poured therein. Interlocking corresponding pluralities of male flanges 66 and female recesses 68 formed respectively along the lip of vessel 60 and in the rim of cover 62 provide a releasable pressure seal between vessel 60 and overfitting cover 62. Compressed air carried to an air fitting 70 in cover 62 by a deformable conduit 72 may be introduced into container 54, elevating the pressure therein above ambient, and vertically depressing pusher plate 64 against batter contained in vessel 60, which is fed into nozzle 56 through a pressure reduction valve 74, best seen in FIG. 8, mounted in vessel 60.

Pressure reduction valve 74 includes a cylindrical valve head 76, having radially symmetrical valve inlet apertures 78 and 78' formed therein, which is mounted in a slot 80 of corresponding shape in vessel 60 against an O-ring 82. Sealed against valve head 76 by an O-ring 82' is a valve body 84 having diametrically opposite radially extending bosses 86 and 86' formed therein for mounting valve 74 on vessel 60 and having a batter collection chamber formed therein communicating with nozzle 56 which is coaxially mounted thereon. Bosses 86 and 86' each have a bore 88 and 88', respectively, therein which is registrable with a corresponding threaded blind bore 90 and 90' formed in vessel 60. Screws 92 and 92' are threaded, respectively, through bores 88 and 88' into blind bores 90 and 90' to register assembled valve 74 in slot 80.

Container-valve assembly 54, 74 is removably mounted on a stand 94, which comprises a shaft 96, vertically rotatably journalled in panel 46 of enclosure 36, having a pair of arms 98 and 98' laterally emergent therefrom for holding a circular support 100 for container 54. Formed in support 100 is a slot 102 in which valve body 84 is registrable, as best seen in FIG. 1. Mounted on shaft 96 and the shoulders thereof formed with emergent arms 98 and 98' is a motor housing 104 having a rotary motor 106, which provides the drive for reciprocating sleeve 58, mounted therein.

Figures 2, 3, 13:
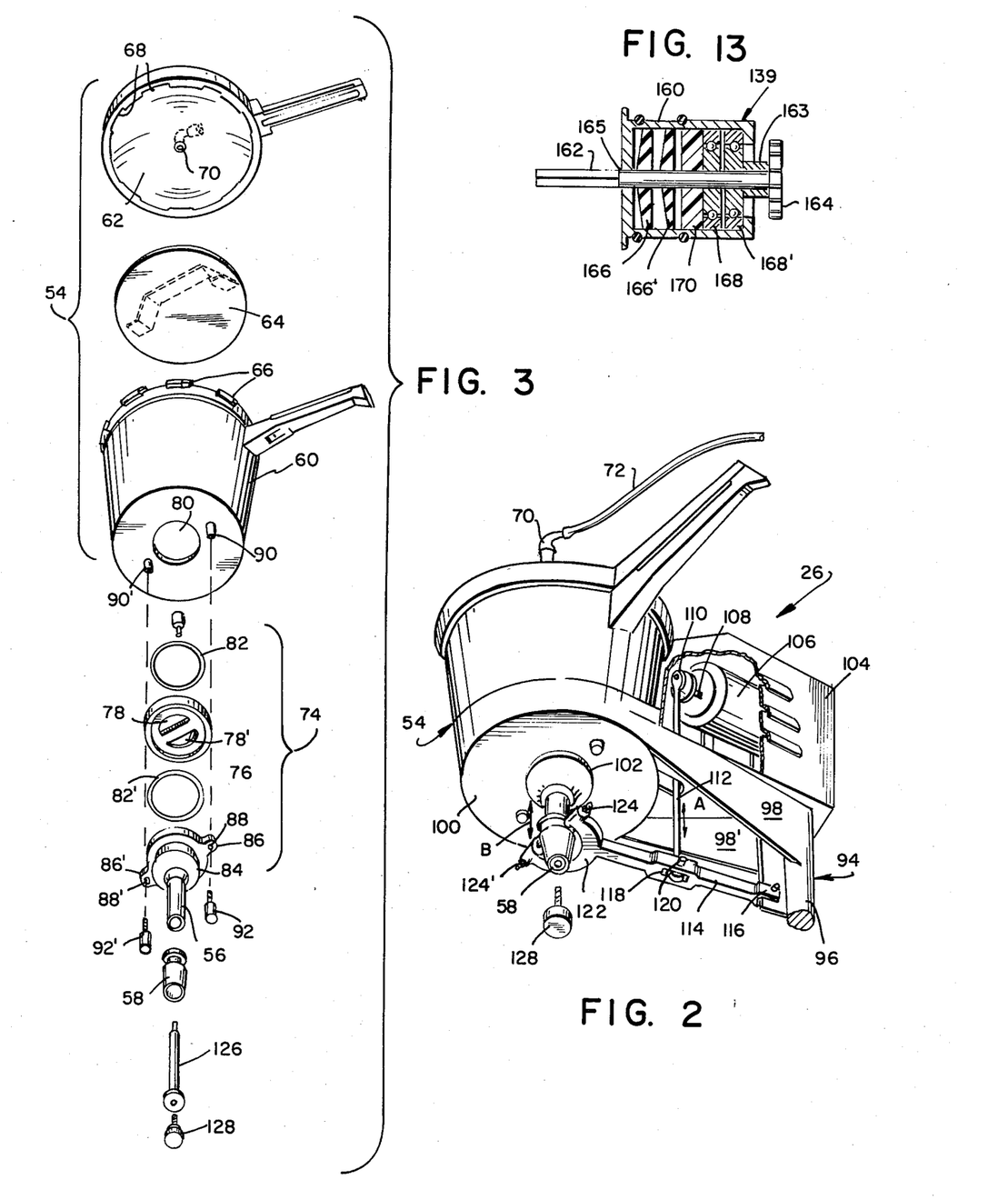
FIG. 2 is an enlarged perspective view of the extruder means seen in the embodiment shown in FIG. 1.
FIG. 3 is an exploded view of the extruder seen in FIG. 2.
FIG. 13 is a sectional view of a modular cartridge of the type rotatably connected to a flipper, which turns the product in the cooking medium for uniform cooking.

Translation of the rotational motion of motor shaft 108 to oscillating motion is effected by a cam-push rod-lever arrangement, best seen in FIG. 2. An eccentric cam 110, connected to shaft 108, has an end of a push rod 112 mounted thereon. The other opposite end of push rod 112 is pivotally connected to a lever 114 having an end 116 pivotally connected to stand 94, having an interior medianly located slot 118, a pin 120 being transversely mounted through said slot, and having a yoke-shaped opposite other end 122. Pin 120 is journalled through push rod 112 and the vertical reciprocal motion of push rod 112, as shown by directional arrow A in FIG. 2, is translated to oscillating motion by lever 114. Sleeve 58 is connected to yoke 122 by spring loaded pins 124 and 124' mounted through the ends thereof. Sleeve 58 is embraced by pins 124 and 124', and as lever 114 is oscillated, sleeve 58 is reciprocated, as shown by directional arrow B in FIG. 2. The coaxial arrangement of sleeve 58 on nozzle 56 is maintained by an extruder stem 126 having a sleeve retaining screw 128 threaded in one end thereof and having its other end connected in a thumb screw threadably mounted in valve head 76. As viscous batter is extruded through nozzle 56 it is configured in sleeve 58 and released therefrom into scroll 28.

Figure 6:
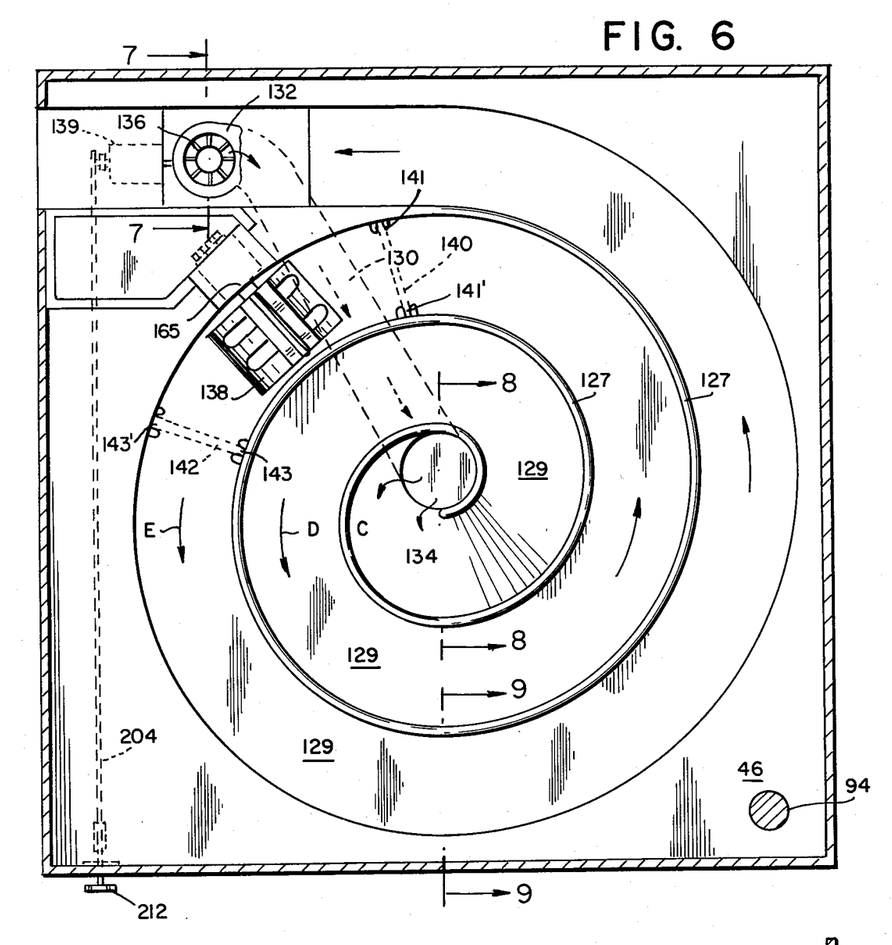
FIG. 6 is a top plan view of the scroll seen in the embodiment illustrated in FIG. 1.
Figure 7:
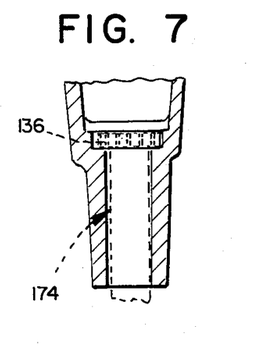
FIG. 7 is a sectional view taken along line 7—7 of FIG. 6.
Figure 8:
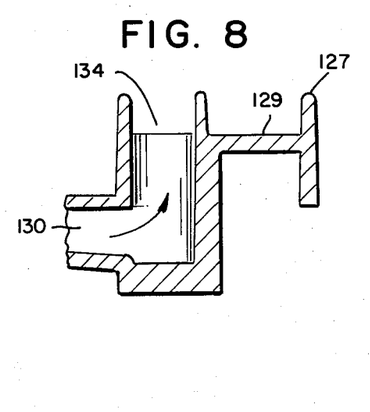
FIG. 8 is a sectional view taken along line 8—8 of FIG. 6.
Figure 9:
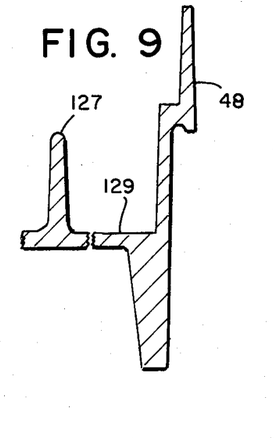
FIG. 9 is a sectional view taken along line 9—9 of FIG. 6.

Optimally, the configured raw product is released onto the center of scroll 28 where, as best seen in FIG. 6, hot flowing shortening carries it through scroll 28 in the direction of directional arrows C, D and E. Scroll 28 comprises a spiral path 129 commencing at the midpoint of scroll 28 and terminating about 2¼ revolutions therefrom. A helically configured side wall 127 defines the spiral path 129, which gradually increases in depth from beginning to end, as best seen in FIGS. 8 and 9. Interiorly formed in scroll 28 is a return flow passage 130, best seen in FIG. 6 in phantom line, having an inlet end 132, best seen in FIG. 7, and an outlet end 134, through which shortening is recirculated into scroll 28. A motor driven impeller pump 136 mounted in the mouth of inlet 132 pumps shortening through passage 130 into scroll 28. The shortening is re-introduced into scroll 28, through outlet 134, under sufficient pressure to complete the course defined by spiral path 129 therein. At the conclusion of the spiral path 129, shortening re-enters flow passage 130 through inlet 132, and again may be recirculated through spiral path 129, in the manner previously described.

To provide intimate contact between the entire surface area of the formed batter and the hot shortening in which it is cooked and carried, the formed batter, after partial cooking, is flipped in the stream of shortening. The flipping mechanism comprises a paddle 138, rotatably mounted on a motor driven cartridge 139, hereafter described in detail, which is positioned in the second revolution of spiral path 129, in linear proximity to inlet 132. The partially cooked product is carried onto paddle 138 by the velocity of the shortening. The speed of the partially cooked product is reduced immediately before it reaches paddle 138 and immediately after it is flipped thereby. This speed reduction is effected by a first dam 140 removably mounted in channels 141 and 141' formed in side wall 127 upstream of paddle 138 and a second dam 142 removably mounted in channels 143 and 143' formed in side wall 127 downstream of paddle 138. The upstream speed reduction of the partially cooked product assures substantial centering thereof on paddle 138 for flipping. Without such a speed reduction, the velocity of the shortening may, on occasion, carry the partially cooked product past paddle 138, and flipping thereof may not be effected. Second dam 142 substantially eliminates turbulence in the stream of shortening as the partially cooked product is flipped back into the stream on its previously unimmersed surface. The partially cooked product continues to cook in the stream of shortening until it is deposited upon conveyor 32, at the conclusion of the cooking cycle, and carried to the point of purchase.

The flow of shortening into inlet 132 of flow passage 130 is controlled by a flow regulator generally numbered 144, as best seen in FIGS. 4, 11, 15 and 16, which comprises a female die 146 of generally rectangular shape having front and rear symmetrical chamfers 148 and 150, respectively, therein and having a beveled interior surface, having a longitudinal aperture 152 therein which is registrable with inlet 132 on which it is mounted, and a complementary male die 154 of generally frusto-cylindrical shape slidably, reciprocably mountable on the beveled surface of die 146 having a passage 155 interiorly formed therein including an inlet 156 registrable with chamfer 148 and an outlet 158 registrable with aperture 152. Dies 146 and 154 are substantially completely immersed in shortening. Ambulatory upstream shortening flows over bevel 148 into passage 155, through inlet 156, and the quantity thereof which enters return flow passage 130 is determined by the degree of registration between outlet 158 and aperture 152, which may be controlled by a manual control means hereafter described in detail.

Figures 12, 14, 15, 16:
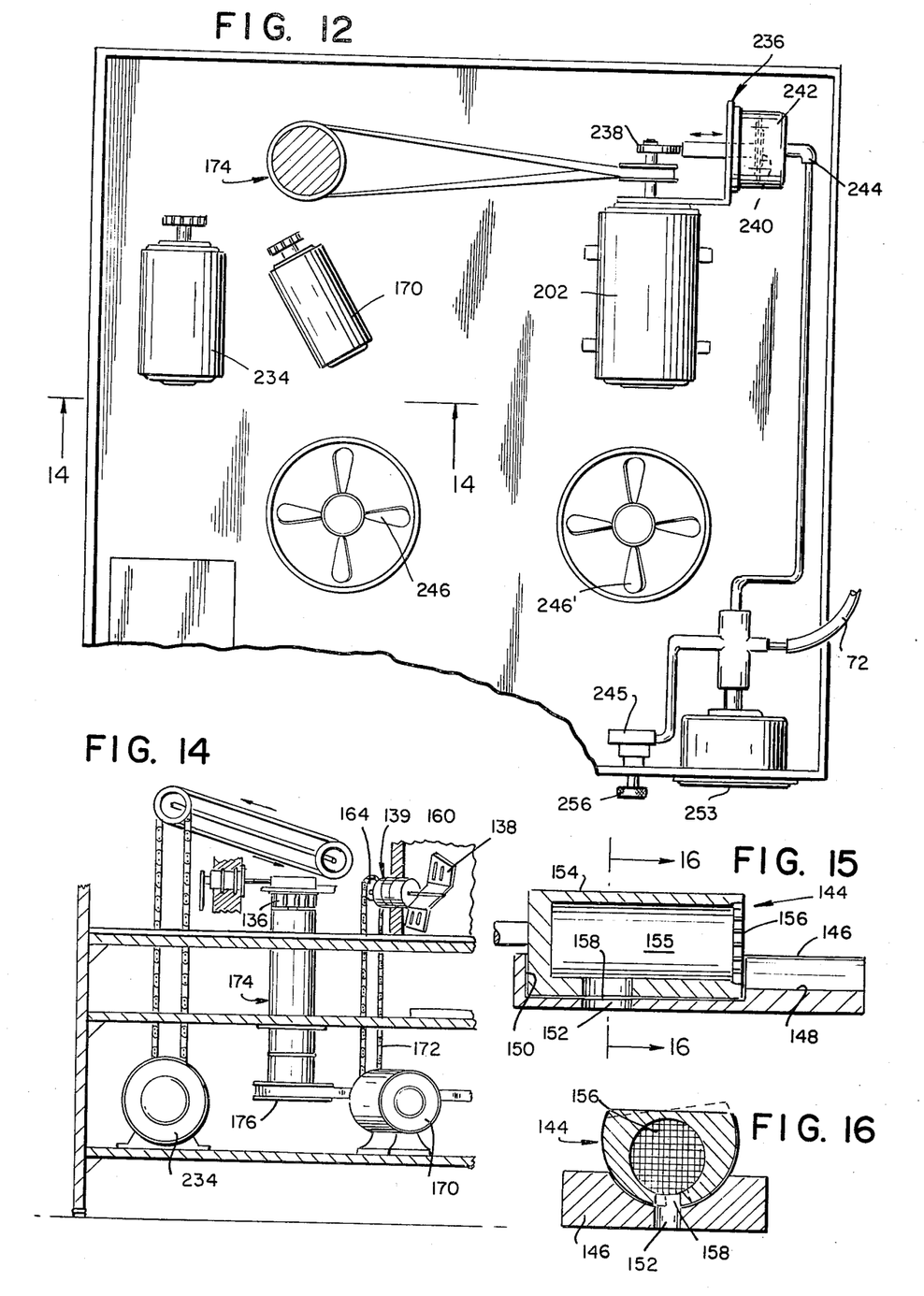
FIG. 12 is a sectional view taken along line 12—12 of FIG. 1.
FIG. 14 is a sectional view taken along line 14—14 of FIG. 12.
FIG. 15 is a sectional view of a frying medium flow regulator of the type used to regulate the cooking medium evacuated from the scroll for recirculation.
FIG. 16 is a sectional view taken along line 16—16 of FIG. 15.

The drive train for paddle 138 is best observed in FIGS. 13 and 14, where it may be seen that cartridge 139, on which paddle 138 is rotatably mounted, is itself removably sealed in scroll 28 and comprises an oil insensitive substantially oil-tight casing 160 housing an axially mounted emergent shaft 162 journalled therein having an end connected to paddle 138 and an opposite end surrounded by a collar 163 formed in casing 160 connected to a gear 164. Surrounding shaft 162 within casing 160 are first and second axially aligned lip seals 166 and 166', respectively, which are separated from respective first and second axially aligned bearings 168 and 168' by a high temperature silicon grease 170. Chronic exposure of bearings 168 and 168' to the shortening in scroll 28 will reduce their effectiveness and experience has shown that shortening will seep into cartridge 139 through journal 165 after prolonged use thereof. But, surprisingly, it is found that the double lip seal and silicon grease backing arrangement prolongs the useful life of bearings 168 and 168' beyond their normal life expectancy.

Use of cartridge 139 simplifies the mechanical replacement of parts in the device. At the conclusion of its useful life it may be removed and replaced with a new modular unit. This feature therefore offers mechanical advantages and simplifies maintenance of the device. A motor 170 is operatively connected to gear 164 by a continuous linkage 172 for thereby rotating shaft 162 and paddle 138.

As best seen in FIGS. 10 and 14, a similar modular cartridge 174 provides the intermediate linkage between impeller 136 and motor driven pulley 176 which comprises an oil insensitive substantially oil-tight cylindrical casing 178 housing an axially mounted emergent shaft 180 having an end connected to impeller 136 and an opposite end surrounded by a collar 182 formed in casing 178 connected to pulley 176. Mounted in the end of casing 178 which is proximate impeller 136 is an oil-tight cap 184 and in spaced relationship thereto is a bearing arrangement axially mounted on shaft 180 comprising a bearing 186, a mechanical carbon seal 188 mounted proximately thereto, a spring loaded rotatably mounted rubber seal 190 biased against carbon seal 188, and a cup washer 192 loaded with a high temperature silicon grease 194 supporting the free end of helical spring 196 which is abutted by a bearing 198. Abutting collar 182 in the end of casing 178 is another bearing 200. Cartridge 174 is employed for all the reasons previously set forth in connection with our discussion concerning cartridge 139, e.g. longevity of the bearings useful life and facile replacement. Oil seepage into cartridge 174 from impeller 136 has the same deleterious effect upon the elements arranged therein, as previously discussed, and this arrangement of elements has the advantage of minimizing the damage done thereby. As best seen in FIGS. 12 and 14, impeller 136 is driven by a motor 202.

Figure 4:
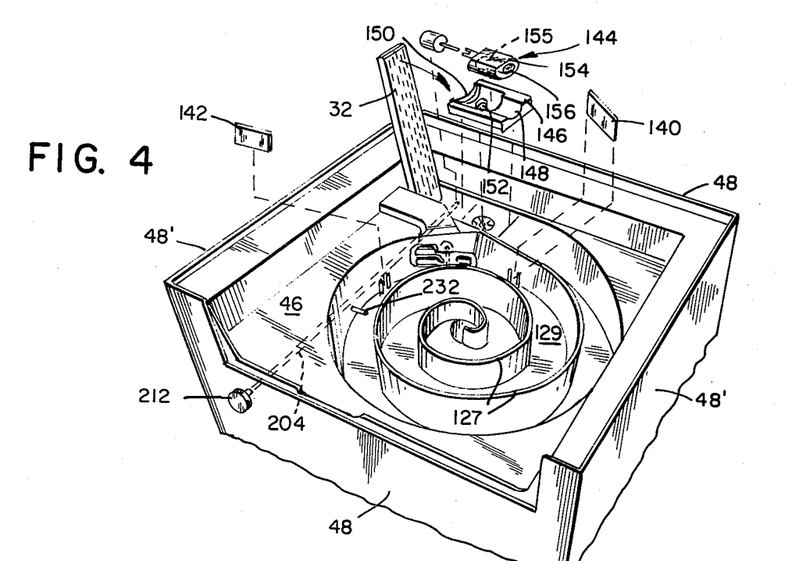
FIG. 4 is a sectional view taken along line 4—4 of FIG. 1.

The manual control means for setting flow regulator 144 which is best seen in FIGS. 4, 10 and 11 includes an elongated shaft 204 having a threaded portion 206 laterally rotatably mounted in panel 48 of enclosure 36. Threaded portion 206 of shaft 204 is threaded through a bracket 208, in parallel alignment with pannel 48, and is threadably engaged in a bore having a length 1 formed in a member 210 mounted on bracket 208. As shown by directional arrow F shaft 204 may be moved axially linearly forward and backward, respectively, by rotating a knob 212 mounted on an end 214 of shaft 204 clockwise or counterclockwise. The other end 216 of shaft 204 terminates in a tongue 218 pivotally connected to one end of an arm 220. The other end of arm 220 is releasably joined to male die 154. Arm 220 is pivotally movable in the directions shown by arrow G, and as expressed in the phantom depiction thereof. As best seen in FIGS. 11 and 16, any linear motion of shaft 204 is translated to rotational motion by tongue and arm arrangement 218, 220. Male die 154 is concomitantly pivoted in female die 146 as arm 220 pivots, and as best seen in FIG. 16 the juxtaposition of outlet 158 in male die 154 relative to aperture 152, which determines the flow of shortening in scroll 28, is governed thereby. It is therefore critical that threaded portion 206 have a length L, which is sufficient to achieve plural degrees of registration between outlet 158 and aperture 152.

As best seen in FIGS. 1 and 5, the shortening is heated by a gas burner 222 underlying scroll 28, which is partially surrounded by a baffle plate 224. The gas is fed to burner 222 from a gas line 226 through a safety by-pass valve 228 into a pilot line 229 connected to burner 222. A thermocouple 230 is operatively connected to valve 228 and pilot line 229. A temperature sensor 232 mounted in a scroll 28 senses the temperature of the shortening in scroll 28 and thermocouple 230 is thermostatically actuated when operational temperatures in scroll 28 are exceeded thereby shunting gas through by-pass valve 228 rather than burner 222, and burner 222 is extinguished until sensor 232 senses a sufficient temperature reduction in scroll 28 to thermostatically actuate thermocouple 230 to restore the flow of gas to burner 222.

As best seen in FIGS. 12 and 14, motors 170 and 202 which respectively operate paddle 138 and impeller 136 are mounted below burner 222 in enclosure 36; also a motor 234, which operates conveyor 32, is mounted in enclosure 36 in the plane of motors 170 and 202. In addition to impeller 136, motor 202 provides the drive for a compressor 236 which provides compressed air for container 54. Compressor 236 comprises an eccentric cam 238 mounted on the shaft of motor 202 which is operatively connected to a piston 240 encased in a housing 242. A fitting 244 and associated conduits connected to housing 242 deliver the compressed air to conduit 72 for redelivery to enclosure 36. Air pressure through the conduits may be adjusted by regulating bleed valve 245. A pair of fans 246 and 246' mounted in the base of enclosure 36, as best seen in FIG. 12, ventilate enclosure 36 during the manufacturing process. Discrete controls and monitors for the operative elements of the device are mounted in front panel 48 of enclosure 36. For example, an adjustable thermostat 248 which provides the operative linkage between sensor 232 and thermocouple 230 is mounted therein, as are toggle switches 250, 252 and 254 which respectively control current to heater 222, pump 136 and extruder 26. The air pressure in container 54 monitored on a gauge 253 may be controlled by adjusting a knob 256, which regulates bleed valve 245. Spent shortening may be evacuated from scroll 28 by a drain valve 258 connected thereto and mounted in front panel 48.

Figure 17:
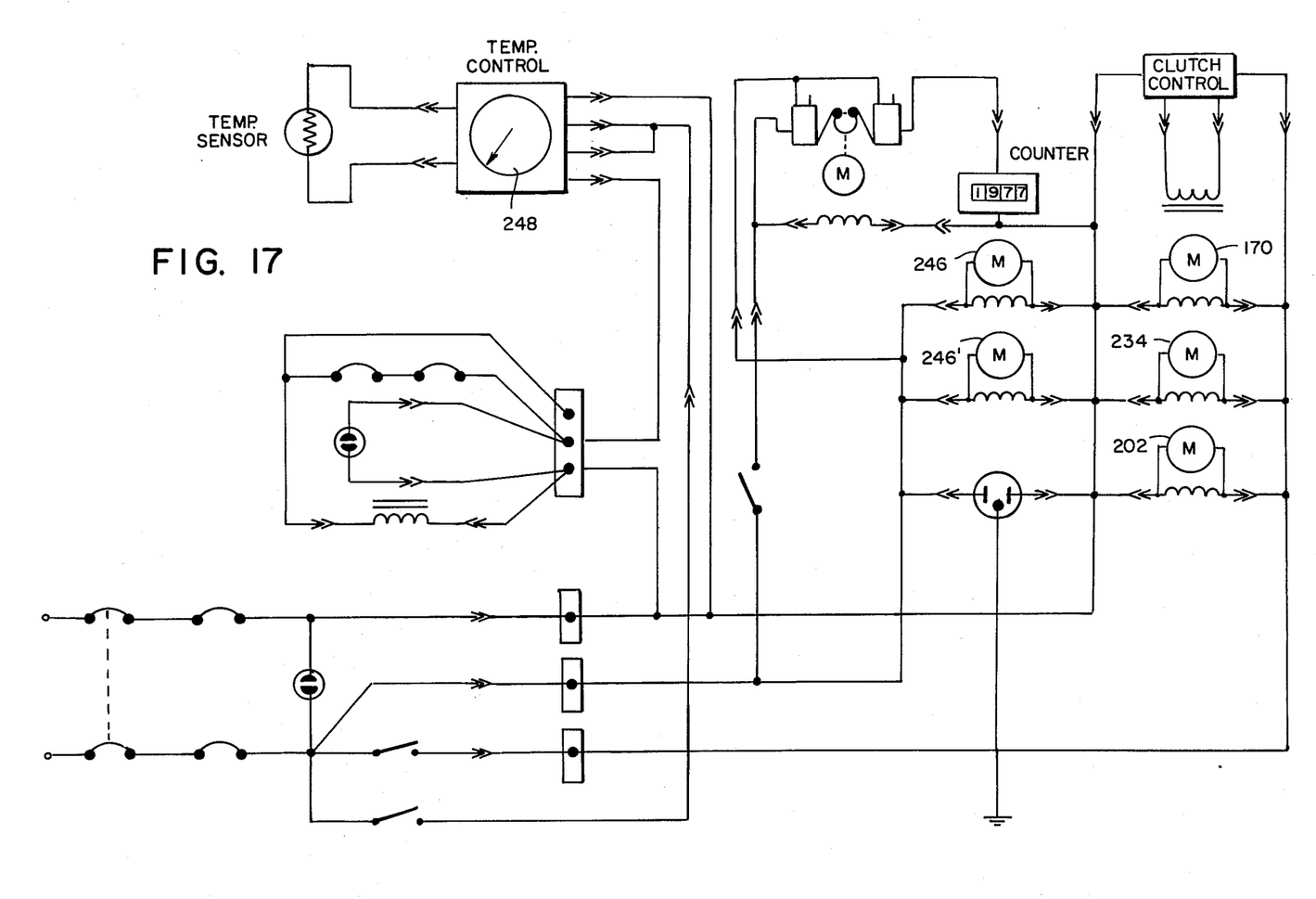
FIG. 17 is a schematic representation of a circuit for a gas fired version of the embodiment seen in FIG. 1.
Figure 18:
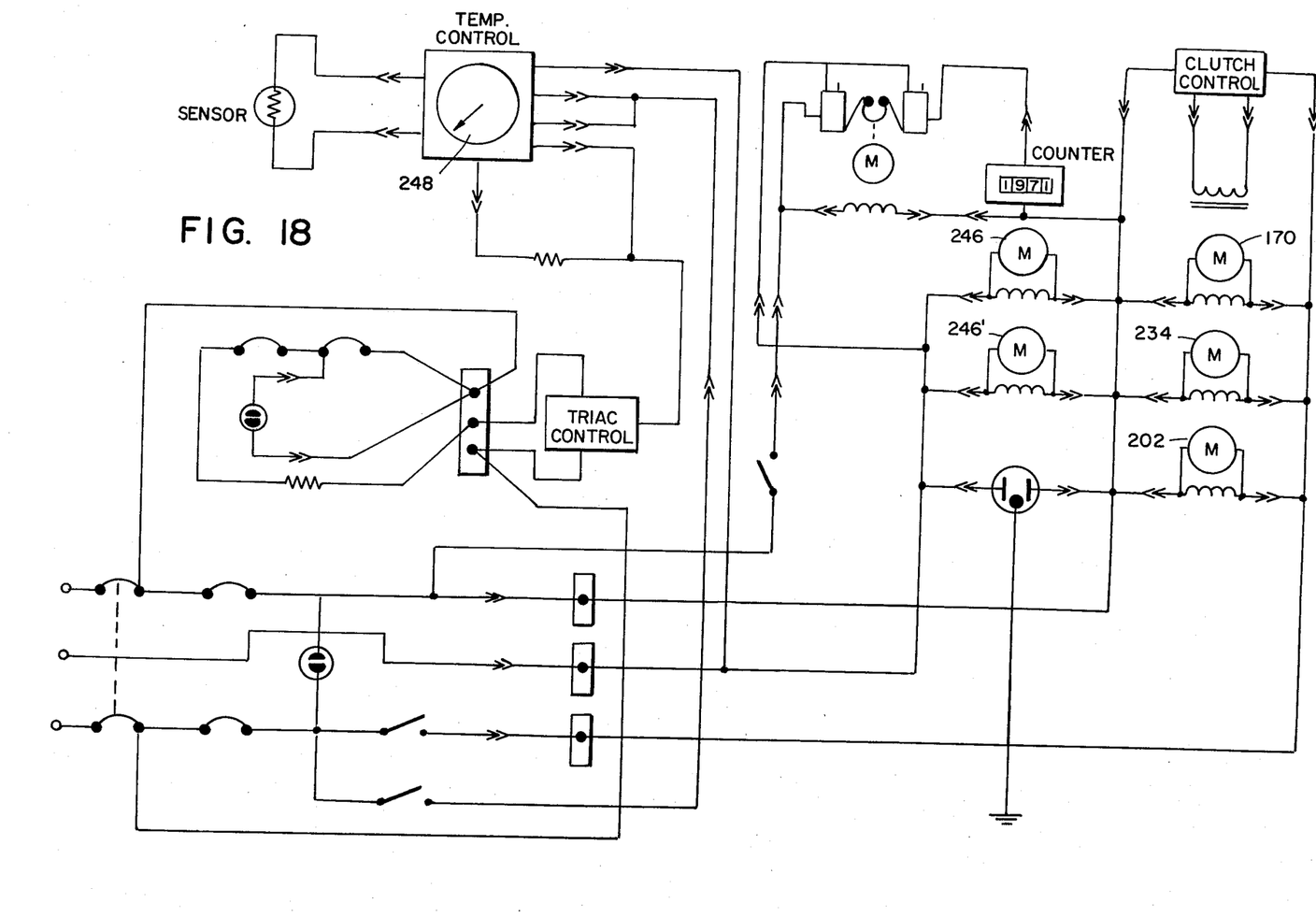
FIG. 18 is a schematic representation of a circuit for an electrically heated version of the embodiment seen in FIG. 1.

An exemplification of a suitable circuit for the gas heated embodiment herein described is schematically depicted in FIG. 17. However, it is intended to be clearly understood that alternatives to gas heat may be operatively employed. For example, gas burner 222 may be replaced with an electric heating element, and a suitable circuit for an electrically heated device is depicted in FIG. 18. Therefore, the type of heat employed to cook the product does not constitute a limitation upon the scope of the invention.

Many types of batters which are suited to use in the device are known to the art-skilled, for example, a dry mix distributed by Hunt-Wesson, Inc. under the trademark MFB, which is a hydrogenated soybean and palm oil. While exhaust fans 246 and 246' may not be critical elements of the invention, it is certainly preferred that enclosure 36 include these fans. It is found that in operation these fans effect five or six air changes per minute within enclosure 36, thereby reducing the internal chamber temperature of enclosure 36.

For satisfactory commercial results, extrusion should be carried out while container 54 is under pressure of about one-half lb. to about five lbs., and preferably the pressure in container 54 should be in the range of about 1½ lbs. to about 2½ lbs. Optimal results are achieved when the pressure is about 1½ lbs. to about 2½ lbs.

Either liquid or solid shortening may be employed for cooking the product. Many suitable shortenings are well-known to the art-skilled. However, it is desirable that the boiling point of the shortening chosen be about 400° F. The surface of scroll 28 may be coated with polytetrafluoroethylene, generically known as Teflon, to facilitate the cleaning of scroll 28. The elements of the device are readily accesssible and may be replaced by persons having minimum skills.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for manufacturing donuts or like products comprising means for extruding raw batter configured as desired; a cooking scroll underlying the extruder means in which the extruded batter is received, said cooking scroll being adapted to contain a flowing hot liquid cooking medium in which the extruded batter is cooked and carried, said cooking scroll including a spiral path of progressively increased depth along which the batter cooks while being carried in the hot liquid cooking medium, the cooking cycle of the batter being functionally related to the length of said spiral path and the rate of flow of the hot liquid cooking medium thereon; means for circulating the cooking medium through said cooking scroll and producing a flow of the cooking medium along said spiral path thereof; means for regulating the temperature of the cooking medium contained in said cooking scroll; means for controlling the flow of the cooking medium in said cooking scroll; means operatively connected to said cooking scroll for reversing the disposition of the partially cooked product in the cooking medium at a substantially median point in said spiral path; said means for reversing the disposition of the partially cooked product in the cooking medium comprising a paddle rotatably mounted in said scroll and being disposed in said spiral path; and means for rotating said paddle, the partially cooked product being drawn onto said paddle by the flowing cooking medium in said spiral path; said means for rotating said paddle comprising a motor driven cartridge comprising an oil-tight casing, a shaft axially mounted in said casing and having first and second ends emergent therefrom, said first end thereof being connected to said paddle and a bearing arrangement mounted on said shaft within said casing including first and second axially aligned lip seals, first and second axially aligned bearings, and high temperature silicon grease loaded between said lip seals and said bearings, a gear, said gear being mounted on said second end of said emergent shaft, and a motor operatively connected to said gear for driving said paddle.

2. The device as claimed in claim 1 including means proximately located at the end of said spiral path for conveying the cooked product to a point of purchase.

3. The device as claimed in claim 1 including a housing for said device comprising a transparent cooking chamber and a liquid-tight enclosure.

4. The device as claimed in claim 3 wherein said housing includes a hood overfitting said cooking chamber, said hood including a selectively actuable means for ventilating said cooking chamber.

5. The device as claimed in claim 1 wherein said means for extruding the configured raw batter into said cooking scroll comprises a pressurizable container into which raw viscous batter may be introduced, an extruder nozzle operatively connected to said pressurizable container which extrudes the raw batter introduced therein from the container, an extruder nozzle sleeve oscillatably mounted on said extruder nozzle for forming the raw batter discharged from said extruder nozzle and releasing the conformed discharged batter into the beginning of said spiral path in said cooking scroll, and means for oscillating said extruder nozzle sleeve on said extruder nozzle.

6. The device as claimed in claim 5 wherein said container comprises a vessel for holding the raw batter; a cover overfitting the mouth of said vessel and adapted to form a releasable air-tight seal therewith; means removably mounted in said vessel for leveling the raw batter held therein, said means being adapted to overlie the raw batter in said vessel and having a substantially planar surface area; and means connected to said container for introducing air at above ambient pressure therein which exerts substantially uniform pressure upon said leveling means, thereby compressing said leveling means and the raw batter underlying it downward through said vessel towards said extruder nozzle operatively connected thereof.

7. The device as claimed in claim 5 including a pressure reduction valve mounted in said container into which the batter under pressure in said container is delivered, said pressure reduction valve comprising a cylindrical valve head having radially symmetrical valve inlet apertures formed therein, a liquid-tight seal between said valve head and said container, a valve body releasably engaging said valve head having a batter collection chamber formed therein communicating with said extruder nozzle; and an air-tight seal between said valve body and said valve head.

8. The device as claimed in claim 5 wherein said means for oscillating said extruder nozzle sleeve comprises a rotary motor having a rotary shaft mounted therein; an eccentric cam mounted on the free end of said rotary shaft; a push rod having first and second diametrically opposite ends, said first end thereof being connected to said eccentric cam; and a lever having one free end, said second end of said push rod being pivotally connected to said lever, said free end of said lever being pivotally connected to said extruder nozzle sleeve.

9. The device as claimed in claim 1 wherein said scroll includes a helically configured side wall which defines said spiral path therein; and a return flow passage formed internally in said scroll underlying said spiral path, said return flow passage having an inlet end communicating with the end of said spiral path and an outlet end communicating with the beginning of said spiral path, said return flow passage being adapted to recirculate the cooking medium to said spiral path.

10. The device as claimed in claim 9 including an impeller mounted in said inlet end of said return flow passage for pumping cooking medium entering said inlet end through said return flow passage and out said outlet end thereof into said spiral path; and means operatively connected to said impeller for driving said impeller.

11. The device as claimed in claim 10 wherein said driving means for said impeller comprises a modular cartridge connected to said impeller comprising an oil-tight casing; a shaft axially mounted in said casing having first and second emergent ends, said first end of said shaft being connected to said impeller; a bearing arrangement mounted on said shaft within said casing including a first bearing, a mechanical carbon seal mounted proximal to said first bearing, a spring loaded rubber seal biased against said carbon seal, a spring which provides the bias on said rubber seal; a cup washer supporting said spring, high temperature silicon grease loaded in said cup washer, and a second bearing abutting said cup washer; a pulley, said pulley being connected to said second emergent end of said shaft; and a motor operatively connected to said pulley for rotating said impeller.

12. The device as claimed in claim 9 wherein said means for controlling the flow of the cooking medium in said cooking scroll comprises a female die having front and rear chamfers therein and a beveled interior surface and further having an aperture therein which is registrable with said inlet end of said return flow passage; a complementary male die reciprocably slidable on said beveled surface of said female die, said male die having an interior passage having an inlet end registrable with one of said chamfers in said female die and having an outlet end registrable with said aperture in said female die; and means connected to said male die for reciprocably sliding said male die on said beveled surface of said female die for selectively altering the degree of registration between said outlet end of said passage in said male die and said aperture in said female die.

13. The device as claimed in claim 1 wherein said means for regulating the temperature of the cooking medium contained in said cooking scroll comprises a heater; means operatively connected to said heater for deactivating and reactivating said heater while said device is in an on-state, said means being responsive to thermostatic actuation; a thermostat connected to said means which thermostatically controls said means; and a temperature sensor connected to said thermostat mounted in the cooking medium flowing in said spiral path.

* * * * *